Figures 1, 2:
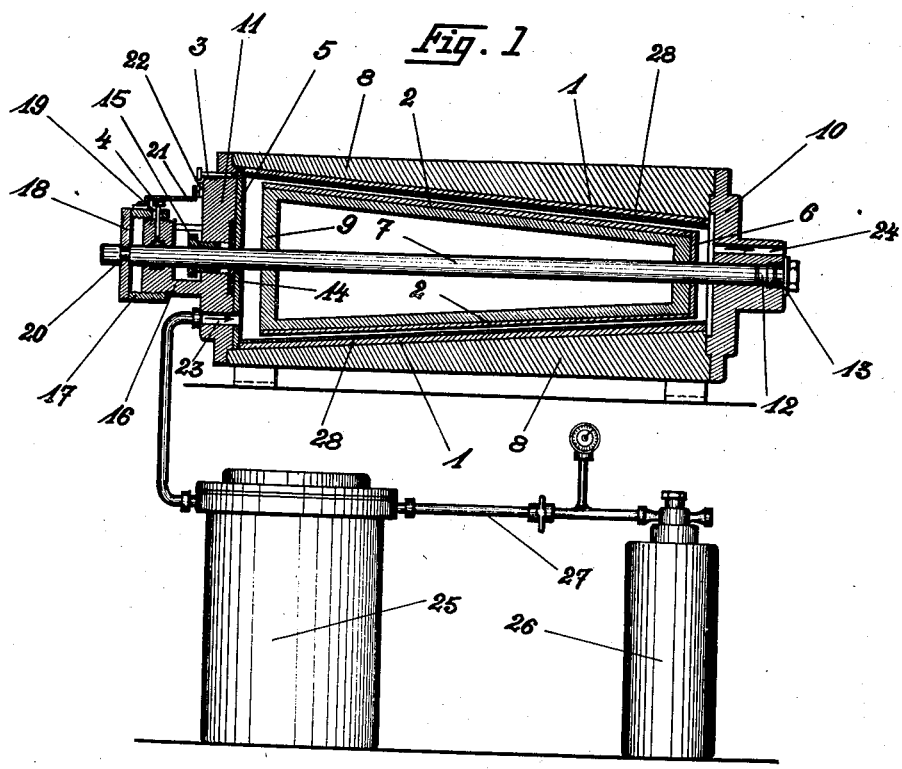

July 6, 1937.　　　P. FEREMUTSCH　　　2,086,324
STERILIZING LIQUIDS
Filed July 16, 1934

Inventor.
Paul Feremutsch,
by
Bryant & Lowry
Attorneys.

Patented July 6, 1937

2,086,324

UNITED STATES PATENT OFFICE 2,086,324

STERILIZING LIQUIDS

Paul Feremutsch, Zurich, Switzerland, assignor of one-half to Adolf Berglein, Hamburg, Germany Application July 16, 1934, Serial No. 735,481
In Germany July 24, 1933

6 Claims. (Cl. 204—24)

The invention is concerned with a method and a device for sterilizing liquids, especially milk. The new method is based upon the principle of the electro-catalytic qualities of oligodynamic metals. It is a well known fact that so-called oligodynamic metals, when brought into contact with liquids, emanate metal-ions, which destroy bacteria living in the liquid.

In practice, without augmenting this natural catalytic effect, the success that is attainable is of small practical importance in view of the fact that even in the presence of a catalyzer as e. g. silver, the result is noticeable only after several hours, and depends greatly upon the surface area of the oligodynamic metal employed. Besides, in the case of colloidal liquids such as fruit-juice, milk, etc., the dispersed particles as e. g. albumen, fat, etc., after being neutralized by means of the positively charged metal ions, settle down upon the surface of the catalyzer and render it largely inactive.

In practice, it must, however, be rendered possible to sterilize great quantities of such liquids within a short time. Until now, this has been possible to some extent, e. g., by means of electrolysis, in which case either direct or alternating current was employed. This method had the disadvantage that great space as well as a great amount of electrical energy was needed, rendering it dangerous and expensive. The electrolytical method also has the great disadvantage that the substance to be sterilized suffers by decomposition and disintegration, heating, forming of sediments, whereby the efficacy of the electrodes is considerably decreased and the quality of the liquid is improved by coagulation, which is especially the case with coarse structured liquids.

According to this invention, a method for sterilizing liquids is suggested, which facilitates the separation of metal-ions into the liquid to be sterilized by electrically charging suitable metal-electrodes with catalytic-oligodynamically active material, e. g. silver, which surrounds the electrodes.

It is assumed that the bacteria absorb the emanated metal-ions and succumb to their poisonous influence owing to the lack of oxygen, caused by the metal surrounding them on all sides, while on the other hand, an electrical recharge takes place, which kills the bacteria. According to another opinion, every living cell possesses an electrical oscillatory circuit, which is disturbed by the metal-ion with which it comes into touch, i. e. it is short-circuited and thereby the cell is destroyed.

In order to separate as great a number of metal-ions as possible within the shortest possible period of time, and to bring them into contact with the bacteria of the liquid, the liquid to be sterilized is caused to flow through a narrow opening between two electrically charged metal-surfaces having oligodynamic qualities, at least one of which is moved past the other at great speed.

The sterilizing effect of this method is considerably increased especially by leading the liquid to be sterilized most suitably in form of film, between cylinders rotating within each other. It is advisable to manufacture one of the electrodes from a material which is well suited for producing ions, e. g. an alloyed or sintered body made of two different metals.

This method may also be employed for a liquid which is stationary within a vessel, if at least one of the electrodes is arranged so as to be movable, by which fact the forming of sediments is avoided and a uniform penetration of the liquid with metal-ions is achieved.

The employment of diaphragms which surround the electrodes is of advantage for preventing the formation of metal-shine. According to a further feature of the invention, it is possible, to improve sterilization, if the liquid flowing under pressure is saturated with carbonic acid, as hereby the electrical line-resistance of the liquid is reduced.

An apparatus for practicing this new method is described in the following with reference to the drawing in which, Fig. 1 is a longitudinal section through a sterilizing device connected to a vessel carrying carbonic-acid under pressure.

Fig. 2 is a side elevation showing the inlet-side of the device.

The device consists of a silver tube (1) of special conical shape, into which is inserted another silver tube (2). In order to obtain a thin film of the liquid, the distance between the tubes should be about 0.3 mm. In this manner, good distribution of the liquid to be sterilized and, at the same time, a good and efficient contact surface of the electrodes is obtained.

Contact-screw 3 is in conductive connection by way of a metal plate (5) with the outer tube (1), while contact-screw 4 is in conductive connection with the inner tube (2) by way of a shaft (7) and a metal disc (6).

The outer tube is insulated and embedded in a casing (8) made of pressed or cast material and the like, whereby the casing itself may be made of insulating material. As far as it is necessary, other parts of the casing must also be insulated or manufactured from suitable insulating substance. The inner tube (2) is firmly attached to the rotating body (9), which is fastened to the shaft (7). Shaft 7 is concentrically arranged on the closing covers 10 and 11 of the casing 8. In cover 10 the shaft encounters a foot-bearing 12 which is adjustable by means of a screw 13. Shaft 7 is led through cover 11 and at the place where it passes through, it is packed by means of packing discs 14 and stuffing box 15. A closure is secured to part 16 of the cover 11, serving as a housing for the shaft and consisting of a threaded part 17 and an end-plate 18. In the closure, a slot 19 is provided which is wide enough to allow sufficient freedom of movement against contact screw 4. In the shaft 7 there is a groove 20 into which plate 18 fits, so that when turning the closure 17, 18, the electrode tubes 1 and 2 can be adjusted with regard to the distance between them. The extent of this adjustment is shown by means of a pointer 21 which is arranged opposite a scale 22.

In the cover 11 there is provided an inlet-opening 23 and in cover 10 an outlet-opening 24. A pressure-chamber 25 is connected to the inlet-opening 23. A tube 27 extends from the carbonic acid apparatus 26 into the pressure chamber (25), and nearly to the bottom therein so that the liquid contained in the vessel may become saturated with carbonic acid.

By means of the conical form of the electrodes, and owing to the fact that they can be moved along the axis, it is possible to adjust the distance between the electrodes according to requirements, and the flow of the liquid passing through is thus advantageously and evenly accelerated. Instead of tubes which rotate within each other, it is also possible to make use of other surfaces which are set in quick motion towards one another, as e. g. plates that are moved backwards and forwards, or rotating discs. Moreover, it is possible instead of providing only two, to provide several rotating tubes which rotate round one another or inside or outside one fixed tube. In order to increase the effective surface of the electrodes, the tubes may be placed in a position crosswise across the axis or may be provided with plates which intersect comblike into one another.

Due to the potential drop between the charged silver-electrodes, silver-ions, as the bearers of positive electric charge, run from the anode to the cathode, so that they come upon the bacteria within the film of the liquid and kill these by poisoning them or by being discharged. The greater the number of ions, the greater will be the disturbing or destructive influence upon the vitality of the bacteria. Since the silver-ion, as the elementary quantity, always retains the same electrical charge, the current-density of the charged electrodes is of importance in so far as the number of ions introduced into the solution within a unit of time is thereby determined. In this manner the disturbing or destructive influence upon the life of the bacteria can be varied. It is therefore possible by means of this method to vary the killing of bacteria according to choice, as the amount of current necessary for killing the various sorts of bacteria varies. Experiments have shown that a charging current of 8-10 amperes with a voltage of 15-20 volts is sufficient in order to sterilize such liquids as may be considered for human consumption.

In order to prevent absorption of metal slime by the liquid, which slime may develop when the ions are separated and therefore the upper section of the metal is loosened, it will be advisable to cover the electrodes with diaphragms, for which purpose thin sheets of microporous metal are most suitable. These sheets are merely intermediate conductors and do not absorb any current. It will be suitable to use for this purpose nickel plates which are covered with a veil-like system of holes visible through a microscope.

In view of the fact that the ions endeavour to reach the cathode in the shortest possible way, and, after discharge having taken place, again return to the metallic state, thereby loosing their germ-killing qualities, it is advisable, considering the wandering velocity of the ions, to change the direction of the current more or less frequently according to the distance between the electrodes. In the present case where the distance chosen between the silver tubes 1 and 2 is about 0.3 mm., with a current density of about 1/100 amperes, and a voltage of about 15 volts, the optimum for changing the direction is every other second. By means of this periodical reversal of the current, it is possible to avoid that superfluous metal particles remain in the liquid. For this purpose, the electric current is passed through the liquid to be sterilized in the opposite direction within certain period of time, which are dependent on the wandering-velocity of the ions, and on the time needed for the destruction of the bacteria. By this process the metal-ion is again retracted to the electrode charged with the opposite electrical current.

Thorough tests regarding the sterilization of coarse-structured liquids as e. g. milk, have shown that results of sterilization have been considerably improved by a previous ionization of the liquid (acidification) by means of carbonic dioxide. With the arrangement herein described, the gas which is led into the container (25) is, at the same time used as pressure medium. The carbonic acid, which has become separated in the watery solution, exercises a catalytic influence, probably owing to the increased concentration of hydrogen-ions.

What I claim is:—

1. In the art of oligodynamic sterilization, an apparatus for sterilizing liquids, e. g., milk, comprising, a stationary internally conical tubular member carrying an electrode, a tapering member nested within said stationary member and carrying an electrode, there being an annular space between said electrodes, at least one of said electrodes consisting of oligodynamically active material, means for axially adjusting said tapering member to predetermine said annular space between said electrodes, means for conducting said liquid through and along said annular space in the form of a thin film determined by said space, means for electrically charging said electrodes, and means for rapidly rotating said tapering member carrying said electrode to agitate said liquid flowing through said space between said electrodes.

2. The apparatus defined in claim 1, wherein said electrodes are charged with direct current, together with means for periodically changing the polarity of said electrodes in intervals of time which are shorter than the time required for moving metal ions from one electrode to another.

3. The apparatus defined in claim 1, together with means for saturating said liquid with carbonic dioxide prior to conducting it through said space between said electrodes.

4. The apparatus defined in claim 1, together with means carried by said electrodes for retaining precipitates and sediments thereon.

5. The apparatus defined in claim 1, together with microporous diaphragm means carried by said electrodes, whereby sediments and precipitates separated from said electrodes are retained thereon.

6. The apparatus defined in claim 1, wherein said electrodes are provided with grooves.

PAUL FEREMUTSCH.